Oct. 15, 1940.                    W. LINDENBERG                    2,218,245
                                 ROLL HOLDING CAMERA
                                 Filed Sept. 9, 1938
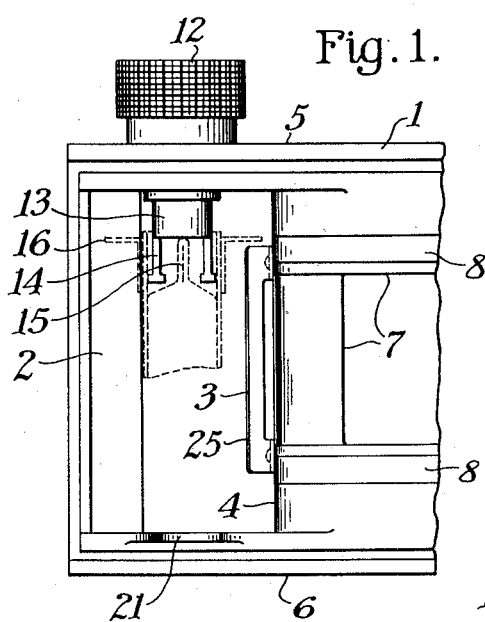
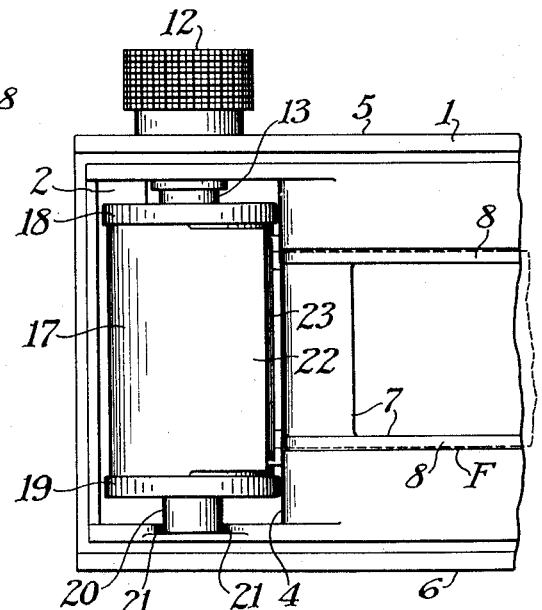
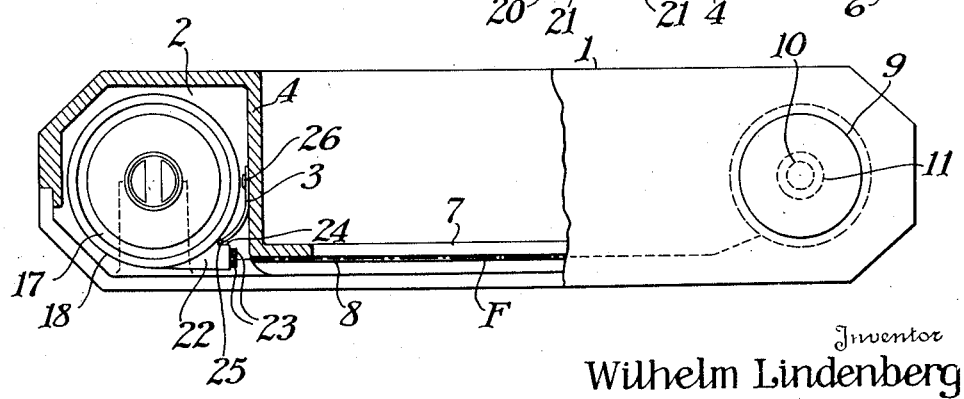
Inventor
Wilhelm Lindenberg
By Newton N. Perrins
   Donald H. Seward
                     Attorney Patented Oct. 15, 1940

2,218,245

UNITED STATES PATENT OFFICE 2,218,245

ROLL HOLDING CAMERA

Wilhelm Lindenberg, Stuttgart, Germany, assignor to Eastman Kodak Company, Rochester, N. Y., a corporation of New Jersey Application September 9, 1938, Serial No. 229,156
In Germany March 15, 1938

3 Claims. (Cl. 95—31)

This invention relates to roll holding camera of the type utilizing roll film in retorts or cassettes.

One object of my invention is to provide a camera adapted to resiliently position a film-holding retort in a spool chamber of the camera. Another object of my invention is to provide a camera with a film winding mechanism with a means for winding the film from a retort in which a slight resilience is provided in the retort mount so that it may give slightly when the winding operation starts. Still another object of my invention is to provide a camera with a spool chamber into which a retort can be easily loaded and quickly positioned. Other objects will appear from the following specification, the novel features being particularly pointed out in the claims at the end thereof.

Fig. 1 is a fragmentary plan of a camera showing a film spool chamber constructed in accordance with and embodying a preferred form of my invention. In this view the camera back has been removed.

Fig. 2 is a view similar to Fig. 1, but with a retort in position in the spool chamber.

Fig. 3 is a part section and part elevation of a camera of the type shown in the preceding figures with the retort in position in the spool chamber.

In cameras of the type utilizing roll film in retorts, it is common practice to wind the film on a spool and to place the spool in a light-tight retort. Such retorts are usually provided with an offset, elongated frame which encloses plush or other material to form a relatively light-tight slot through which the film may pass to and from the retort.

In most of the retorts on the market there are, in effect, trunnions between the retort and the camera, one trunnion being formed by an extension on one end of the film spool and the other trunnion usually being formed by a camera part which enters into an aperture in the opposite side of the film spool so that the retort may be axially positioned with respect to a film rewinding mechanism. It is common practice with such film to thread the film across the exposure aperture onto a winding mechanism and after successive sections of the film have been exposed, they are returned to the retort so as to be made light tight for removal from the camera.

My present invention is particularly directed to a spring bearing member carried in the camera spool chamber for resiliently engaging and positioning the retort so that at the start of a winding operation, the retort may give slightly, thus offering less strain to the film, and, in addition, the tendency of the spring is to press the retort away from the direction of winding so as to assist in holding the film flat.

Referring now to the drawing, Fig. 1 shows the fragmentary section of a camera body 1 which is provided with a supply spool chamber 2 in which the spring member 3 is placed, in the present instance on the inner wall 4 of the spool chamber which lies between the top wall 5 and bottom wall 6 of the camera. The exposure frame designated broadly as 7 is only partially shown and there are guide rails 8 which properly direct the film across the exposure frame for exposure.

As indicated in Fig. 3, there is a main winding key 9 mounted on a shaft 10 which carries a hub 11 to which the end of a film F is attached in threading the film across the exposure frame 7. There is a second winding key 12 which is attached to a shaft 13 having a pair of prongs 14 extending down on both sides of a web 15 formed in the spool 16 which is carried on the inside of a retort 17. This winding key 12 is purely for rewinding the film on spool 16 after it has been completely exposed.

The retort 17 may be of the usual type having a centrally apertured end 18, through which the shaft 13 projects to form one trunnion, and having a centrally apertured end 19, through which a hub member 20 of the spool 16 projects to form a second trunnion, this hub member 20 resting in a notch or seat 21 formed for the purpose of positioning the retort.

As indicated in Fig. 3, the retort has an offset portion 22 which is tangentially arranged with respect to the retort and which is lined with suitable plush or light-tight material 23 to form an opening through which the film F may pass to and from the retort.

The walls 22 form a seat 24 which is adapted to receive the end 25 of the spring member 3 which is attached, as by rivets 26, to the wall 4 of the supply spool chamber 2.

There are a number of reasons for making this retort positioning member resilient. First, it permits the camera spool chamber 2 to be made as small as possible, because, in placing and removing the retort 17 to and from the spool chamber 2, the spring 3 will flex out of the path of the retort. Second, when the retort has been positioned in the spool chamber, the spring, by engaging in the seat 24, will tend to move the retort to its proper position, as shown in Fig. 3, in which the lips 23 are spaced opposite the end of the film guideway. In this position the retort is also axially positioned in the spool chamber by means of the trunnions 13 and 20. Thirdly, in starting a winding operation, particularly after the film has not been moved for some time, it occasionally occurs that the film takes a set and considerable torque must be applied to start the film moving. When the winding key 9 is turned, if the film tends to stick in the retort 17, the spring 3 may give a short distance and thus relieve the strain on the film, and when the winding movement is completed, the spring may, by tending to return the retort to the position shown in Fig. 3, stretch the film taut for exposure.

Of course, the movement of the retort about its axis is comparatively slight because the end of the spring 3 is seated in the recess 24 formed between the light-tight film exit and the cylindrical body of the retort 17.

With the construction above described, it is impossible to improperly locate the retort 17 in the film spool chamber because, in loading, the end of the film F projects a short distance from the light-tight opening 23 and the retort is placed in the camera by entering the arms 14 on each side of the flange 15 in the spool. This opening is reached because the end 18 of the retort is apertured for this purpose. The opposite trunnion 20 of the film spool is then brought downwardly into the seat 21, and as this occurs, the spring 3 flexes rearwardly to permit the passage of the retort into the spool chamber 2. However, as soon as the retort comes to rest, the spring 3 flexes outwardly again so that the end 25 catches and holds in the seat 24 to properly position the retort in the camera. All of this takes place without any particular care on the part of the operator.

If the retort should be accidentally placed in any other position, the trunnions could not be brought into engagement with their supporting members and the offset portion 22 could not be loaded into the spool chamber in the incorrect position.

What I claim as my invention and desire to be secured by Letters Patent of the United States is:

1. In a roll holding camera, the combination with a spool chamber, of a film retort mounted therein, a pair of trunnions for supporting the film retort, a seat in the film spool chamber for supporting a trunnion, an offset light-tight film passageway extending across said retort, and a spring carried by the camera and extending substantially parallel to the offset light-tight film passageway and engageable with a wall of the light-tight film passageway tending to hold the film retort in a predetermined position.

2. In a roll holding camera, the combination with a spool chamber, of a film retort mounted therein, a pair of trunnions for supporting the film retort, a seat in the film spool chamber for movably supporting a trunnion of the retort, an offset light-tight film passageway extending across said retort, and means carried by the camera tending to resiliently hold the retort in a predetermined position and also permitting said trunnion to move in its seat.

3. In a roll holding camera, the combination with a spool chamber, of a film retort mounted therein, a pair of trunnions for supporting the film retort, an offset light-tight film passageway extending across said retort, and a resilient retort engaging member carried between the retort and spool chamber tending to hold the retort in a predetermined position on the trunnions and permitting a limited predetermined movement on the trunnions with respect to the camera body.

WILHELM LINDENBERG.